United States Patent
Ha et al.

(10) Patent No.: US 9,257,933 B2
(45) Date of Patent: Feb. 9, 2016

(54) VARIABLE SPEED INDUCTION MOTOR WITH SINGLE EXTERNAL POWER SUPPLY AND CONTROL METHOD THEREOF

(75) Inventors: Jung Ik Ha, Seoul (KR); Sung Min Kim, Pyeongtaek-si (KR); Seung Ki Sul, Seoul (KR); Yong Su Han, Daejeon (KR)

(73) Assignee: SNU R&DB FOUNDATION, Seoul (KR)

( * ) Notice: Subject to any disclaimer, the term of this patent is extended or adjusted under 35 U.S.C. 154(b) by 415 days.

(21) Appl. No.: 13/597,663

(22) Filed: Aug. 29, 2012

(65) Prior Publication Data
US 2013/0057195 A1   Mar. 7, 2013

(30) Foreign Application Priority Data
Sep. 7, 2011 (KR) .......... 10-2011-0090854

(51) Int. Cl.
 *H02K 11/00* (2006.01)
 *H02P 23/00* (2006.01)
 *H02P 25/26* (2006.01)
 *H02P 27/05* (2006.01)

(52) U.S. Cl.
 CPC ............ *H02P 25/26* (2013.01); *H02P 27/05* (2013.01)

(58) Field of Classification Search
 USPC ........................... 318/812; 310/68
 See application file for complete search history.

(56) References Cited

U.S. PATENT DOCUMENTS

| | | | | |
|---|---|---|---|---|
| 4,443,748 A | * | 4/1984 | Boev | H02P 3/22 318/732 |
| 5,424,625 A | * | 6/1995 | Haner | H02K 29/10 318/400.41 |
| 6,321,032 B1 | * | 11/2001 | Jones | H02K 29/10 318/724 |
| 2003/0071596 A1 | * | 4/2003 | Gokhale et al. | 318/727 |
| 2006/0261776 A1 | * | 11/2006 | Jones | H02P 25/102 318/725 |
| 2010/0134074 A1 | * | 6/2010 | Crane | H02K 19/26 322/79 |
| 2011/0140432 A1 | * | 6/2011 | Acedo Sanchez et al. | H02P 9/006 290/44 |
| 2011/0285252 A1 | * | 11/2011 | Hyde | H02K 3/28 310/68 B |

FOREIGN PATENT DOCUMENTS

| | | |
|---|---|---|
| JP | 2004-260982 A | 9/2004 |
| JP | 2007-300779 A | 11/2007 |
| KR | 10-1983-0005751 A | 9/1983 |
| KR | 10-1998-087820 A | 12/1998 |

\* cited by examiner

*Primary Examiner* — Eduardo Colon Santana
*Assistant Examiner* — Said Bouziane
(74) *Attorney, Agent, or Firm* — Fenwick & West LLP

(57) ABSTRACT

A single external power supply variable speed induction motor and a control method thereof are disclosed. An induction motor includes: a stator in which coils directly connected to a single-phase or 3-phase or more systematic power supply are wound; a rotor that is supported to be rotatable in the stator; a power conversion device that is attached to the rotor and controls a rotor current without connection of a separate external power supply; and a control circuit that is connected to the power conversion device and controls the power conversion device.

19 Claims, 14 Drawing Sheets

VARIABLE SPEED INDUCTION MOTOR WITH SINGLE EXTERNAL POWER SUPPLY AND CONTROL METHOD THEREOF

CROSS-REFERENCE TO RELATED APPLICATION

This application claims priority to Korean Patent Application No. 10-2011-0090854, filed on Sep. 7, 2011, and all the benefits accruing therefrom under 35 U.S.C. §119, the contents of which in its entirety are herein incorporated by reference.

BACKGROUND

1. Field

The present disclosure relates to an induction motor and a control method thereof, and more particularly, to a single external power supply variable speed induction motor and a control method thereof.

2. Description of the Related Art

A general induction motor is an alternating current motor which is directly connected to a 3-phase power supply to be started by direct online. However, when an inducer is directly operated, an inrush current is large. Accordingly, in a case of a large capacity induction motor, the direct online is difficult, and a speed control is also difficult. For the speed control and the initial start, an inverter has to be used in the induction motor. However, when the inverter is used, there is a defect of causing harmonics of a systematic power supply on characteristics of the inverter. To supplementing this, it is general to connect the inverter to a converter. FIG. 1 shows a direct online start driving system of a general squirrel cage induction motor. Since a power conversion device is not used between a 3-phase systematic power supply and an induction motor, it is possible to drive the motor with the lowest cost. However, there is a defect that it is difficult to control a speed of the motor, and overcurrent flows at the time of initial start of the motor.

To control the speed of the induction motor, generally, an inverter is used. An alternating current voltage source necessary for the inverter may be configured by using a low-cost diode rectifier. FIG. 2 shows a driving system using such a diode rectifier. In such a case, although an induction motor is driven at a variable speed, there a defect that harmonics drastically occurs in a systematic power supply due to the diode rectifier.

To satisfy harmonic standard of the 3-phase power supply while driving the induction motor at the variable speed, a structure of attaching a PWM converter between the inverter and the systematic power supply may be used. This is shown in FIG. 3. In such a configuration, it is possible to lower a harmonic ratio of the systematic power supply while driving the induction motor at the variable speed. However, the system with such a structure requires a high cost.

A doubly feed driving system with a structure similar to the structure shown in FIG. 3 may be used as shown in FIG. 4. In the structure, a stator is directly connected to a 3-phase power supply, and rotor coils are connected to the systematic power supply through a separate power conversion device. In this case, the power conversion device connected to the rotor has to enable the power to flow in two ways, and thus the converter has to be used with the inverter. To connect the wires of the rotor to the power conversion device, an additional connection structure such as a slip-ring is necessary for the motor. Korean Patent Publication No. 1998-087820 discloses a multi-slip-ring device and a control method thereof in which it is possible to drive loads only by several slip-rings with no limit to the number of loads provided in a rotation device according to a control by a communication method using an electronic control device. The multi-slip-ring device includes first to third power supply slip-rings and first and second communication slip-rings, which are fixed to a rotation shaft to rotate in cooperation with the rotation shaft and are disposed at a predetermined distance, and first to fifth brushes that come in contact with outer circumferential edges of the slip-rings and transmit 3-phase power and control signals to the slip-rings. As described above, to transmit the power to the rotor, it is essential to directly connect the external 3-phase systematic power supply.

SUMMARY

According to an aspect of the present disclosure, it is possible to minimize the power conversion device necessary to drive the induction motor at the variable speed. That is, it is possible to control a rotor current without connection of a separate external power supply.

Although the induction motor is directly connected to the systematic power supply, it is possible to perform a variable speed control through a proper control of the power conversion device.

In addition, it is possible to keep a harmonic ratio of the systematic power supply very low.

A representative configuration of the present disclosure to achieve the object is as follows.

According to an aspect of the present disclosure, there is provided an induction motor including: a stator in which coils directly connected to a single-phase or 3-phase or more systematic power supply are wound; a rotor that is supported to be rotatable in the stator; a power conversion device that is attached to the rotor and controls a rotor current without connection of a separate external power supply; and a control circuit that is connected to the power conversion device and controls the power conversion device.

According to another aspect of the present disclosure, there is provided an induction motor including: a stator in which coils directly connected to a single-phase or 3-phase or more systematic power supply are wound; a rotor that is supported to be rotatable in the stator; a contactor that is attached to a rotor shaft to allow an electric current to flow in the rotor from the outside; a power conversion device that is connected to the rotor through the contactor out of the rotor and controls a rotor current without connection of a separate external power supply; and a control circuit that is connected to the power conversion device and controls the power conversion device.

In the induction motor, the power conversion device may be an inverter using a power element.

In the induction motor, the power conversion device may be connected to a load, and an insulated voltage may be transmitted to the load.

In the induction motor, the control circuit may include: a outer controller that generates a torque command necessary to drive the induction motor; a rotor DC-link voltage controller that generates a power command of the rotor on the basis of a DC-link voltage of the power conversion device; a current command generator that generates a rotor current command on the basis of the generated torque command and/or the generated rotor power command; and a current controller that generates a voltage command on the basis of the generated rotor current command, the DC-link voltage, and the rotor current, wherein the power conversion device may apply a voltage to the rotor on the basis of the generated voltage command.

In the induction motor, the rotor current command may include a d-axis current command and a q-axis current command, and the current command generator may generate the q-axis current command on the basis of the torque command, and may generate the d-axis current command on the basis of the power command of the rotor and the q-axis current command, to generate the rotor current command.

In the induction motor, the rotor current command may include a d-axis current command and a q-axis current command, and the current command generator may generate the q-axis current command on the basis of the torque command, and may generate the d-axis current command on the basis of the power command of the rotor, to generate the rotor current command.

In the induction motor, the rotor current command may include a d-axis current command and a q-axis current command, and the current command generator may generate the d-axis current command and the q-axis current command on the basis of the torque command and the power command of the rotor, to generate the rotor current command.

In the induction motor, the outer controller may include a speed feedback controller that controls a speed of the rotor. According to another aspect of the present disclosure, there is provided a control method of an induction motor, the method including: generating a torque command necessary to drive the induction motor including a stator in which coils directly connected to a single-phase or 3-phase or more systematic power supply are wound, a rotor that is supported to be rotatable in the stator, a power conversion device that is attached to the rotor and controls a rotor current without connection of a separate external power supply, and a control circuit that is connected to the power conversion device and controls the power conversion device; generating a power command of the rotor on the basis of a DC-link voltage of the power conversion device; generating a rotor current command on the basis of the generated torque command and/or the generated rotor power command; generating a voltage command on the basis of the generated rotor current command, the DC-link voltage, and the rotor current; and applying, by the power conversion device, voltage to the rotor on the basis of the generated voltage command to control the rotor current.

In the control method of the induction motor, the rotor current command may include a d-axis current command and a q-axis current command, and in the generating of the rotor current command, the q-axis current command may be generated on the basis of the torque command, and the d-axis current command may be generated on the basis of the power command of the rotor and the q-axis current command, to generate the rotor current command.

In the control method of the induction motor, the rotor current command may include a d-axis current command and a q-axis current command, and in the generating of the rotor current command, the q-axis current command may be generated on the basis of the torque command, and the d-axis current command may be generated on the basis of the power command of the rotor, to generate the rotor current command.

In the control method of the induction motor, the rotor current command may include a d-axis current command and a q-axis current command, and in the generating of the rotor current command, the d-axis current command and the q-axis current command may be generated on the basis of the torque command and the power command of the rotor, to generate the rotor current command.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF MAIN ELEMENTS

Figure 1:
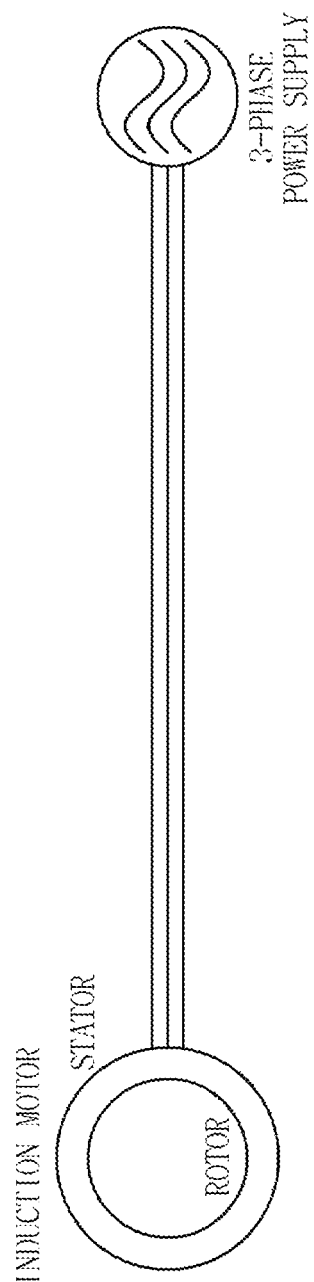
FIG. 1 is a diagram illustrating a direct online start driving system of a squirrel cage induction motor of the related art.
Figure 2:
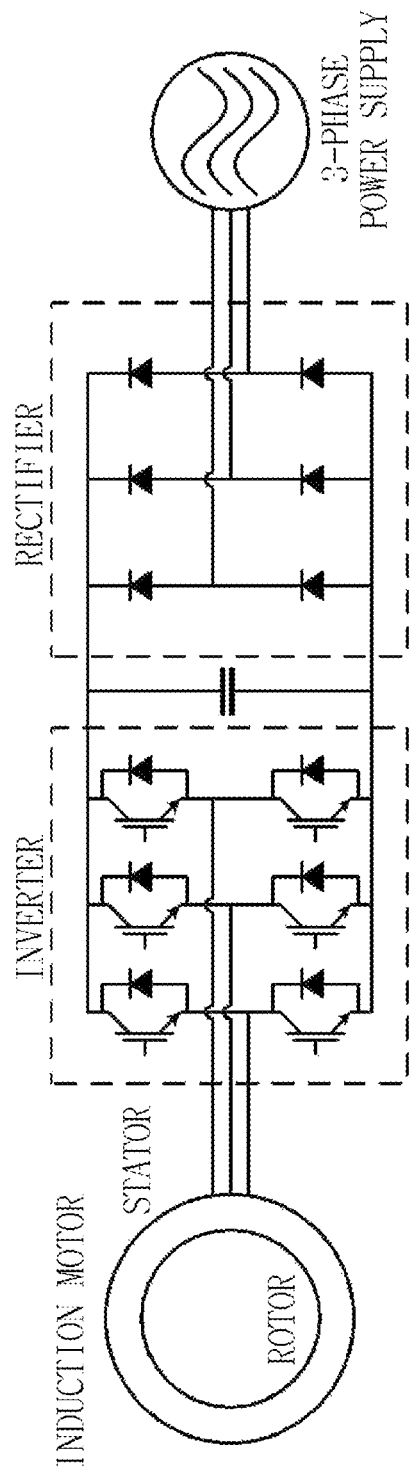
FIG. 2 is a diagram illustrating an inverter driving system for controlling the squirrel cage induction motor of the related art.

1: alternating current power supply
10: induction motor
100: stator
200: rotor
300: power conversion device
400: control circuit
410: outer controller
420: rotor DC-link voltage controller
421: voltage controller (PI)
430: current command generator
431: first current command generating module
432: second current command generating module
433: third current command generating module
434: fourth current command generating module 440: current controller
500: load

DETAILED DESCRIPTION

The present disclosure will be described in detail with reference to the accompanying drawings illustrating specific embodiments as examples to embody the present disclosure. The embodiments will be described for a person skilled in the art to sufficiently embody the present disclosure. Various embodiments of the present disclosure are different from each other, but it should be understood that it is not necessary to be mutually exclusive. For example, specific shapes, structures, and characteristics described herein may be embodied as the other embodiment without deviating from the sprit and scope of the present disclosure. It should be understood that the positions and disposition of individual constituent elements in the disclosed embodiments may be changed without deviating from the sprit and scope of the present disclosure. Accordingly, the detailed description to be described later is not understood as limitative meaning, and the scope of the present disclosure is limited only by accompanying claims with the entire scope equivalent to what is claimed by claims, as long as the scope is appropriately described. In the drawings, similar reference numerals and signs are the same over various aspects or indicate similar functions.

Figure 5:
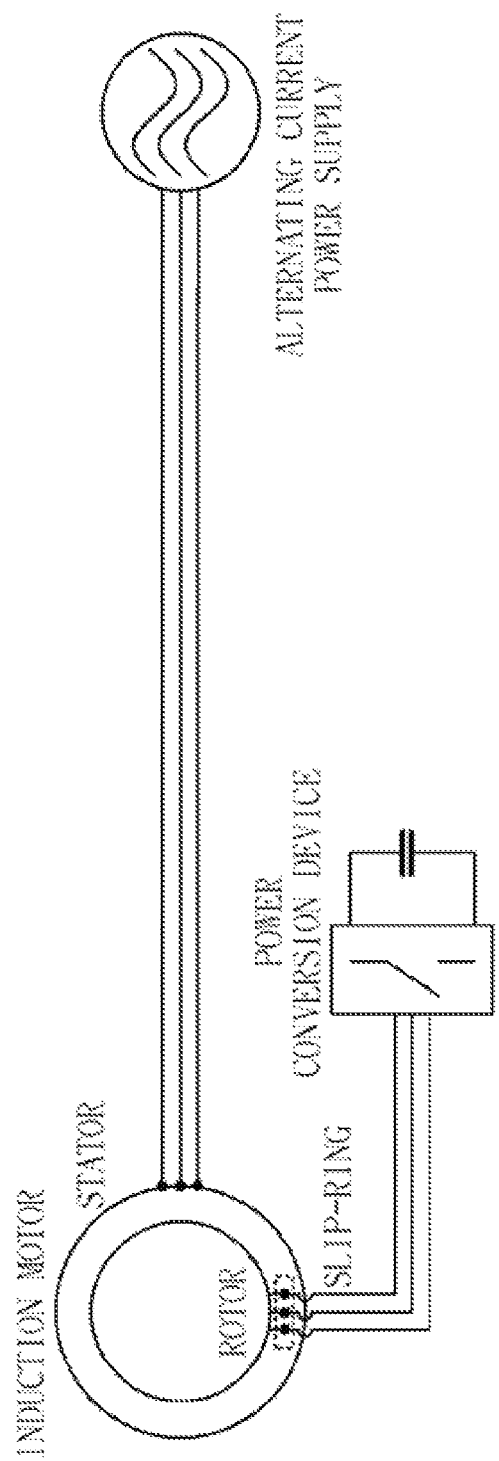
FIG. 5 is a diagram illustrating a induction motor driving system with single power supply according to an embodiment of the present disclosure.

FIG. 5 shows a induction motor driving system with single power supply according to an embodiment of the present disclosure. In an embodiment of the present disclosure, a new induction motor driving system is disclosed in which a harmonic ratio of a systematic power supply is minimized while minimizing a power conversion device necessary in driving the induction motor at a variable speed. In an embodiment, the induction motor driving system is disclosed on the basis of a 3-phase systematic power supply, but it is obvious that the induction motor driving system according to an embodiment of the present disclosure may be applied to a single-phase or multi-phase systematic power supply of 4 phases or more, and the present disclosure is not limited to the 3-phase systematic power supply.

Figure 3:
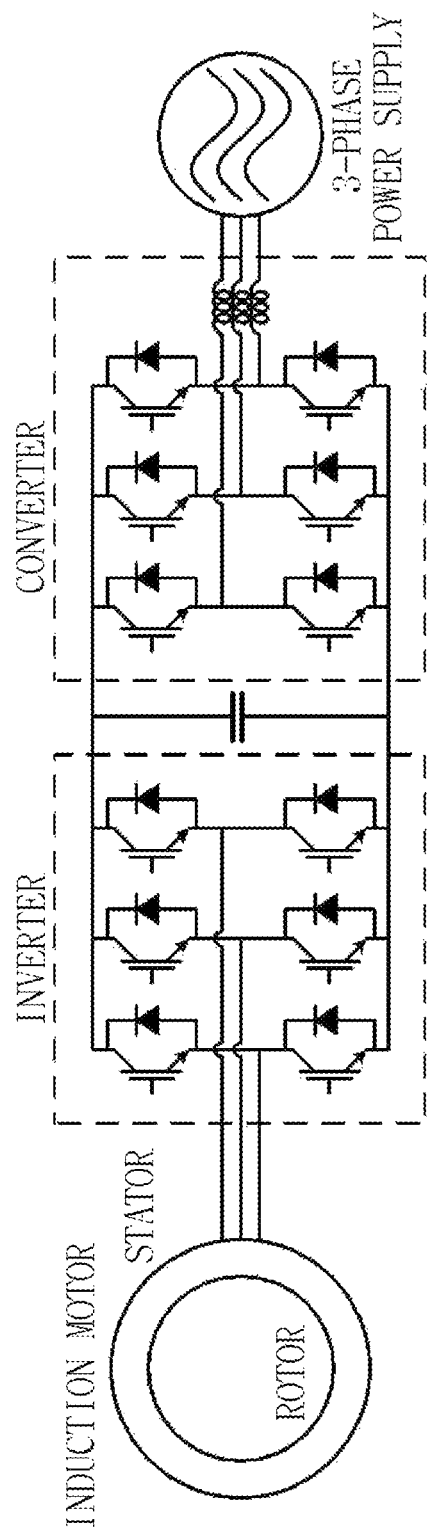
FIG. 3 is a diagram illustrating an inverter-converter driving system for controlling the squirrel cage induction motor of the related art.
Figure 4:
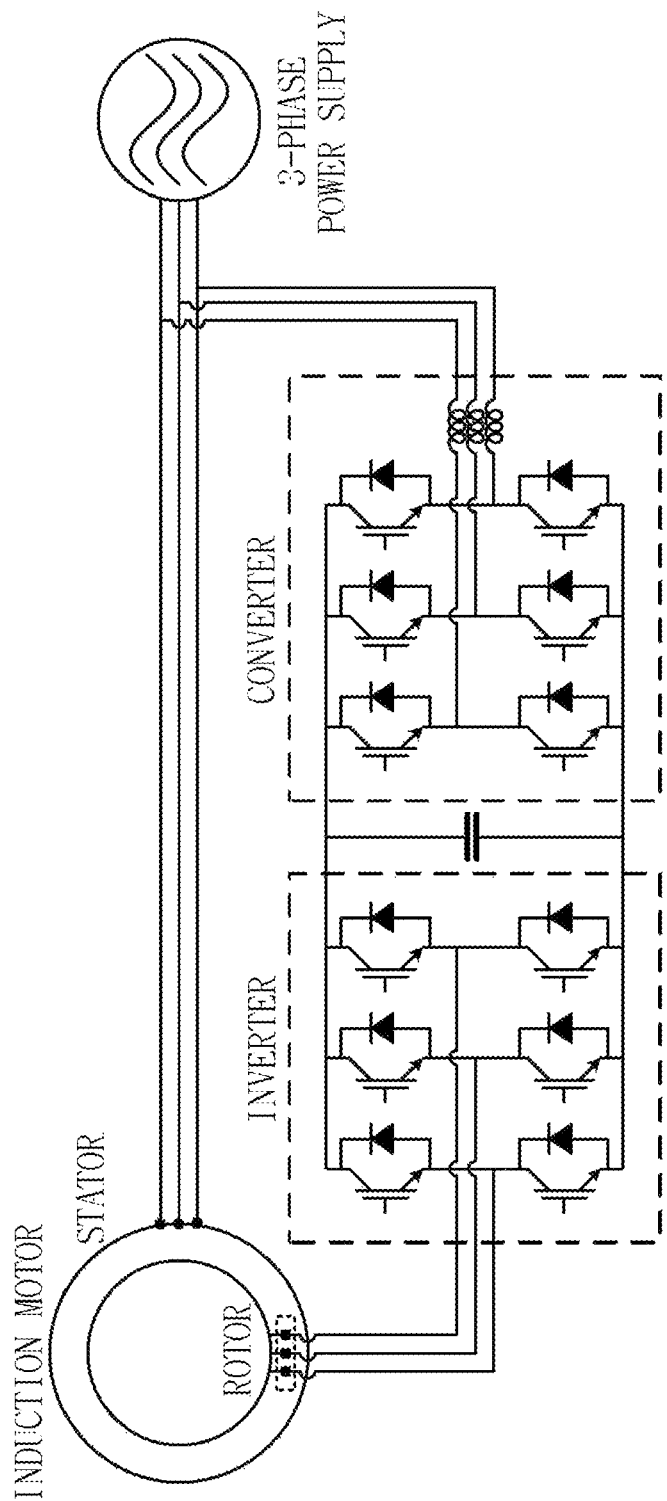
FIG. 4 is a diagram illustrating a control doubly feed driving system of a wound induction motor of the related art.

The power conversion device shown in FIG. 5 is connected to a rotor and plays a role of controlling a current of the rotor. To drive the power conversion device, energy has to be supplied. In the induction motor driving system shown in FIG. 3 and FIG. 4 in the related art, it is possible to transmit power through a converter connected to an inverter. However, the 3-phase systematic power supply of the present disclosure is connected to only stator coils, and the rotor is not connected to a separate external power supply. Accordingly, it is necessary to adjust power transmitted to the rotor through the stator and adjust the power of the power conversion device connected to the rotor. It is possible to perform a variable speed control through such a proper control of the power conversion device although the induction motor is directly connected to the 3-phase systematic power supply, and it is possible to keep a harmonic ratio of the systematic very low. In the structure shown in FIG. 5, the power conversion device connected to the rotor is present out of the induction motor, and thus a slip-ring structure is necessary in the motor. The slip-ring is a contactor attached to a rotor shaft to allow current to flow in a rotor of the motor or an engine from the outside.

Figure 6:
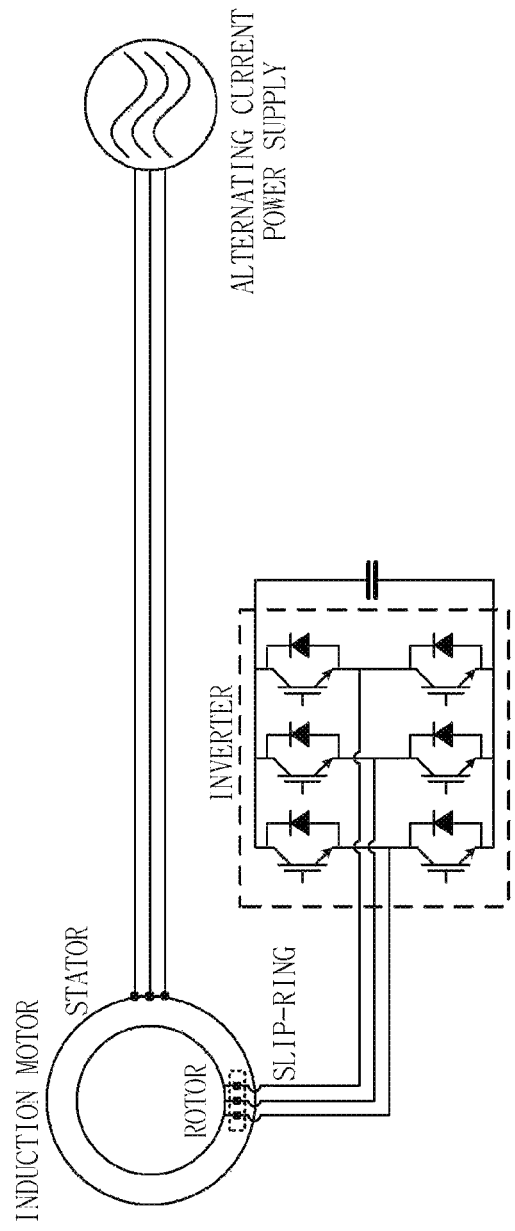
FIG. 6 is a diagram illustrating a signal power supply induction motor driving system using a PWM inverter according to an embodiment of the present disclosure.

FIG. 6 shows an induction motor driving system with single power supply using a PWM inverter according to an embodiment of the present disclosure. The PWM inverter connected to the rotor may be both of a single-phase inverter and a multi-phase inverter, and may be a multi-polarity inverter irrespective of the number of polarities. Generally, the single inverter is configured by connecting an IGBT element to a reverse parallel diode, but the present disclosure is not limited to this power elements.

Figure 7:
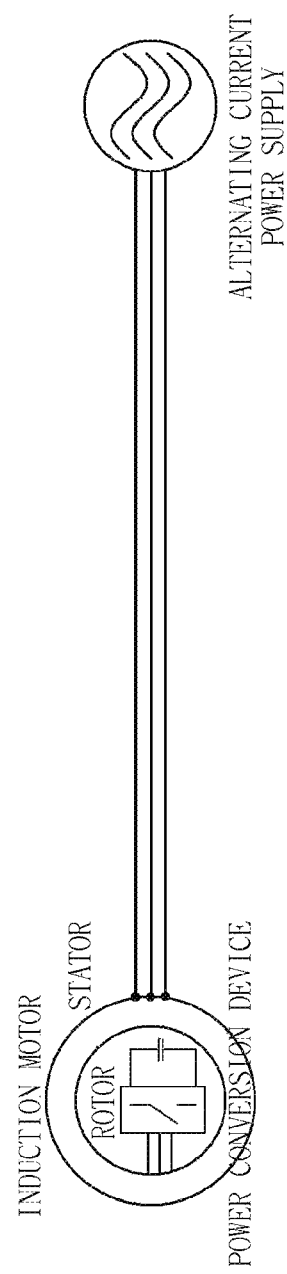
FIG. 7 is a diagram illustrating an inverter integrated induction motor driving system with single power supply according to an embodiment of the present disclosure.

FIG. 7 shows an inverter integrated induction motor driving system with single power supply according to an embodiment of the present disclosure. The system shown in FIG. 7 shows the other structure of the induction motor driving system with single power supply shown in FIG. 5 described above. Since the power conversion device connected to the rotor is present out of the induction motor, the power conversion device may be attached to the rotor to remove the slip-ring. It is a possible structure because the power conversion device connected to the rotor is not connected to an external additional power supply source, and thus it is possible to embody a smaller and lower-price induction motor since the slip-ring is removed. Since the 3-phase systematic power supply is directly connected to the stator of the induction motor as viewed from the outside, it is the same as the direction online start structure of the induction motor. However, it is possible to perform a variable speed control and a torque control of the induction motor through the power conversion device of the rotor, and it is possible to keep the harmonic ratio of the systematic power supply low.

Figure 8:
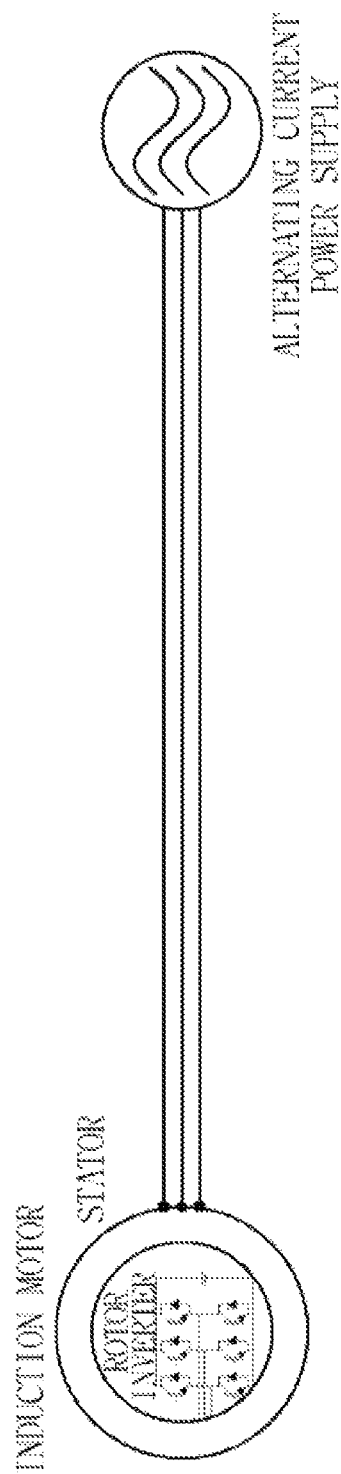
FIG. 8 is a diagram illustrating an inverter integrated induction motor driving system with single power supply using a PWM inverter according to an embodiment of the present disclosure.

FIG. 8 shows an inverter integrated induction motor driving system with single power supply using a PWM inverter of an embodiment of the present disclosure. The PWM inverter connected to the rotor may be both of a single-phase inverter and a multi-phase inverter, and may be a multi-polarity inverter irrespective of the number of polarities. Generally, the single inverter is configured by connecting an IGBT element to a reverse parallel diode.

Figure 9:
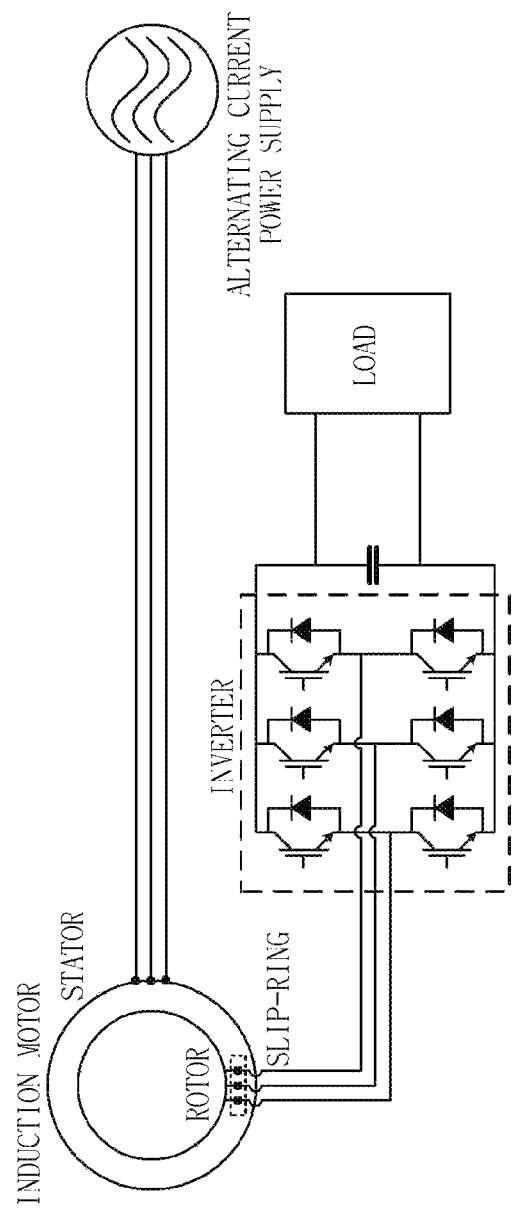
FIG. 9 is a diagram illustrating an inverter integrated signal power supply induction motor driving system connected to a load according to an embodiment of the present disclosure.

FIG. 9 shows an inverter integrated induction motor driving system with single power supply to which a load is connected according to an embodiment of the present disclosure. In FIG. 9, it is possible to connect a voltage with magnitude different from that of a power supply voltage to a separate load, and it is possible to supply the voltage in an insulated state.

Figure 10:
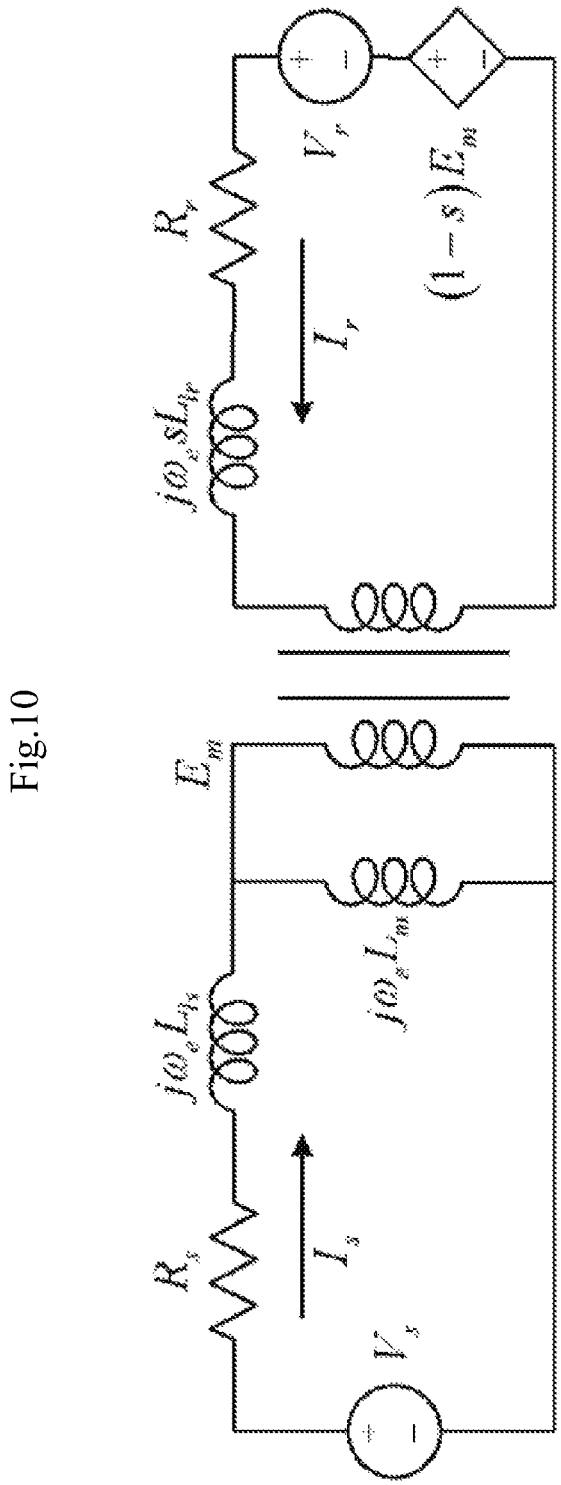
FIG. 10 is a diagram illustrating an equivalent model of a single power supply induction motor according to an embodiment of the present disclosure.

FIG. 10 shows an equivalent model of a single power supply induction motor according to an embodiment of the present disclosure. The stator of the induction motor is connected to a 3-phase systematic fixed alternating current power supply, and a variable power supply is connected to the rotor, to control a rotor motor. In this structure, kinds of targets which the power conversion device connected to the rotor has to control are two. The first is an instantaneous torque necessary to drive the motor, and the second is power flowing through the power conversion device connected to the rotor.

First, a control method of the instantaneous torque of the induction motor may be known through an equivalent model of the induction motor shown in FIG. 10. In the equivalent model, there are three power supplies. A systematic power supply connected to the stator and a rotor power supply generated by the power conversion device connected to the rotor are two individual power supplies, and a power supply generated according to a driving state of the rotor is one dependent power supply. The independent power supply connected to the stator is the fixed power supply connected to the 3-phase systematic power supply, and the dependent power supply generated equivalently in the rotor is determined according to a driving condition of the induction motor. Accordingly, in the system, the rotor power supply is varied to control the rotor current, and the rotor current induces the stator current to generate the torque of the motor.

When the current of the 3-phase alternating current motor flows in stator coils of each phase, a current vector of each phase is defined corresponding to a magnetic flux vector determined by a position of a coil of each phase and a magnitude of a current moment value. A direction of a main magnetic flux vector (a rotor magnetic field vector of a frequency ω) formed by synthesizing the magnetic flux vector of each phase is taken as a d axis, a direction perpendicular thereto is taken as a q axis, and a current vector formed by synthesizing the current vector of each phase is divided into components on a dq-axis coordinate rotating in synchronization with the main magnetic flux vector and is controlled, which is called a vector control of an alternating current motor. The dq-axis coordinate system is rotated in synchronization with the main magnetic flux vector, and thus each synchronous dq-axis component is normally a direct current amount. The d-axis current (magnetic flux current) that is a component in the magnetic flux direction of the current vector controls the magnetic flux, and the q-axis current (torque current) of the component perpendicular to the magnetic flux controls the torque. These are field current in the direction alternating motor, and the magnetic flux is controlled by an armature current. In the specification, the physical properties such as the current, the voltage, and the magnetic flux are defined by a d-axis and q-axis direction, and the d and q are expressed by representing them by subscripts.

The following equation 1 is a stator and rotor voltage equation of the induction motor representing FIG. 10 in a general arbitrary w-based rotation coordinate system. This is induced by Kirchhoff's voltage law and Ohm's law. The equation 2 represents a stator and rotor magnetic flux in this case, and the equation 3 is an instantaneous torque equation generated in this case.

$$v_{ds}^\omega = R_s i_{ds}^\omega + \frac{d}{dt}\lambda_{ds}^\omega - \omega\lambda_{qs}^\omega$$

$$v_{qs}^\omega = R_s i_{qs}^\omega + \frac{d}{dt}\lambda_{qs}^\omega + \omega\lambda_{ds}^\omega$$

$$v_{dr}^\omega = R_r i_{dr}^\omega + \frac{d}{dt}\lambda_{dr}^\omega - (\omega - \omega_r)\lambda_{qr}^\omega$$

$$v_{qr}^\omega = R_r i_{qr}^\omega + \frac{d}{dt}\lambda_{qr}^\omega + (\omega - \omega_r)\lambda_{dr}^\omega$$

[Equation 1]

$$\lambda_{ds}^\omega = L_s i_{ds}^\omega + L_m i_{dr}^\omega$$

$$\lambda_{qs}^\omega = L_s i_{qs}^\omega + L_m i_{qr}^\omega$$

$$\lambda_{dr}^\omega = L_m i_{ds}^\omega + L_r i_{dr}^\omega$$

$$\lambda_{qr}^\omega = L_m i_{qs}^\omega + L_r i_{qr}^\omega$$

[Equation 2]

$$T_e = \frac{3}{2}\frac{P}{2}L_m(i_{dr}^\omega i_{qs}^\omega - i_{qr}^\omega i_{ds}^\omega)$$

[Equation 3]

When it is assumed that it is possible to control the rotor current, it is possible to calculate the rotor voltage and the stator current using the equation 1 to the equation 3 by the slip condition in that case, and the instantaneous torque is generated.

The second is a power control of the rotor power conversion device. The rotor power conversion device is not connected to an external separate power supply source, and thus a voltage to control the rotor current is generated using the power transmitted from the stator to the rotor. Accordingly, the rotor current has to be controlled such that the power necessary to control the rotor current in the rotor is transmitted from the stator to the rotor. The power necessary in the rotor is a loss necessary in the operation of the power conversion device. When the power conversion device connected to the rotor is the PWM inverter using a generally used switching element as shown in FIG. 6 and FIG. 8, a switching loss of a power semiconductor, an electric connection loss, a capacitor loss, a power supply necessary in an inverter controller, a power necessary to drive a switch, and the like may be included in the loss necessary in the operation of the power conversion device.

Figure 11:
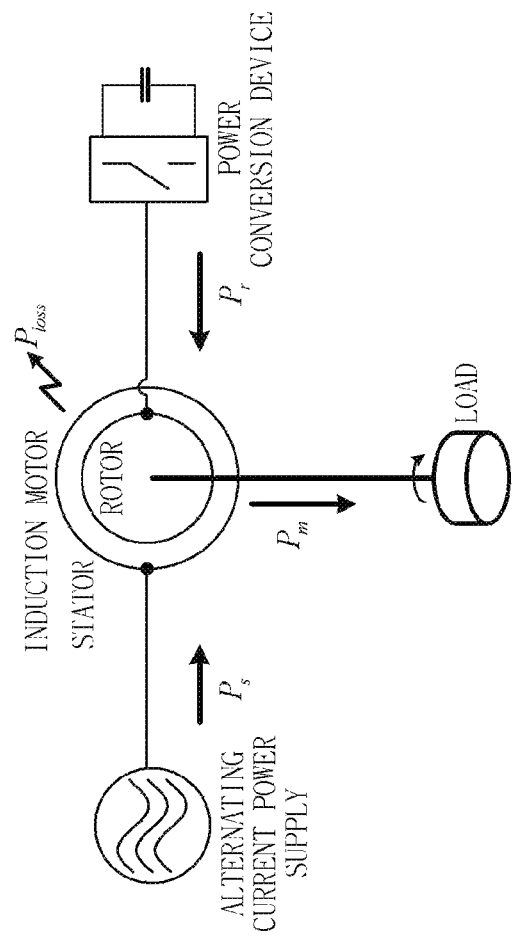
FIG. 11 is a diagram illustrating a power flow of a single power supply induction motor according to an embodiment of the present disclosure.

FIG. 11 shows a power flow diagram of the single power supply induction motor according to the present disclosure. The power supplied as an input to the induction motor is Ps input from the stator power supply. Although FIG. 11 represents the power supplied from the rotor power conversion device to the induction motor, the rotor power conversion device is not provided with a separate external power supply. Therefore, actually, it is not permitted to supply the power, and rather the power necessary to control the rotor current has to be supplied to the power conversion device. And, since the DC-link voltage of the power conversion device has to be controlled, it is difficult to unconditionally receive the power from the stator. For this, Pr that is the rotor power has to be controlled to control the DC-link voltage. A copper loss and a core loss in the motor may be represented by Ploss including the losses of the rotor coils and the stator coils, and a mechanical output that is an output of the induction motor is represented by Pm. In this case, the relational equation of the power is represented as the equation 4.

$$P_s + P_r = P_m + P_{loss}$$

[Equation 4]

Figure 12:
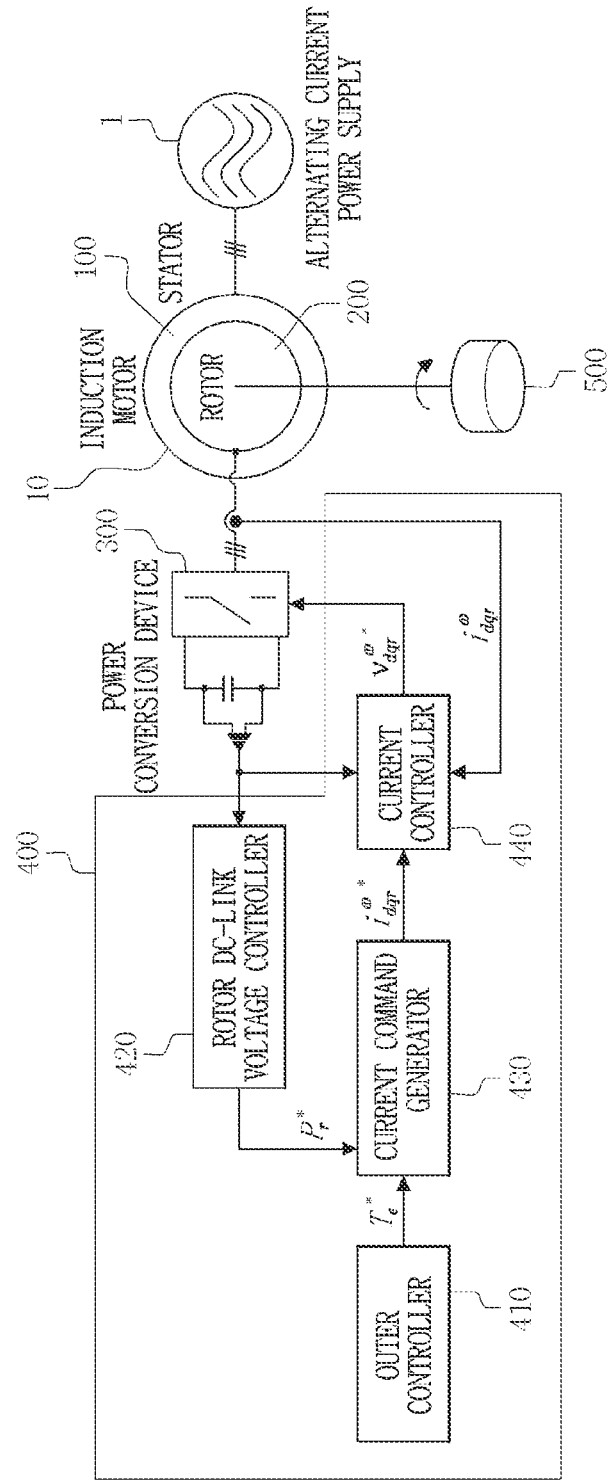
FIG. 12 is a diagram illustrating a control circuit configuration of a single power supply induction motor according to an embodiment of the present disclosure.

FIG. 12 shows a control configuration diagram of a single power supply induction motor 10 according to the present disclosure. The induction motor 10 may include a stator 100, a rotor 200, a power conversion device 300, and a control circuit 400. An alternating current power 1 may be connected only to the stator 100 of the induction motor 10. The load 500 may also be connected to the stator 100 of the induction motor 10. The load 500 may include mechanical load or source.

In the stator 100, a coil directly connected to the alternating current power 1 is wound. The rotor 200 is supported to be rotatably in the stator 100. The power conversion device 300 is attached to the rotor 200, and controls the rotor current without connection of a separate external power supply. The control circuit 400 is connected to the power conversion device, and controls the power conversion device 300.

Specifically, the control circuit 400 includes a outer controller 410, a rotor DC-link voltage controller 420, a current command generator 430, and a current controller 440.

The outer controller 410 generates a torque command Te* necessary to drive the induction motor 10. The outer controller 410 may include a speed controller, and in the superordinate system, an arbitrary torque command Te* may be determined.

The rotor DC-link voltage controller 420 generates a power command Pr* of the rotor on the basis of the DC-link voltage Vdc of the power conversion device.

The current command generator 430 generates a rotor current command idqrw* on the basis of the generated torque command Te* and/or the generated rotor power command Pr*.

The current controller 440 generates a voltage command vdqrw* on the basis of the generated rotor current command idqrw*, the DC-link voltage Vdc, and the rotor current idqrw. The power conversion device 300 applies voltage to the rotor 200 to control the rotor current on the basis of the generated voltage command vdqrw*.

The rotor current command idqrw* is determined by the torque command Te* generated in the outer controller and the rotor power command Pr* for controlling the DC-link voltage Vdc of the power conversion device connected to the rotor.

The torque command Te* required in the outer controller may be represented by a stator current, a rotor current, a stator magnetic flux, and an air-gap magnetic flux. When it is represented by the rotor magnetic flux λ and the rotor current i using the equation 3 and the equation 2 representing the torque Te, it is represented as shown in the equation 5. The rotor power Pr is determined by the rotor voltage v and the rotor current i in the equivalent circuit shown in FIG. 9. The rotor power Pr is represented as shown in the equation 6.

$$T_e = \frac{3}{2}\frac{P}{2}(\lambda_{qr}^\omega i_{dr}^\omega - \lambda_{dr}^\omega i_{qr}^\omega) \quad \text{[Equation 5]}$$

$$P_r = \frac{3}{2}(v_{dr}^\omega i_{dr}^\omega + v_{qr}^\omega i_{qr}^\omega) = \quad \text{[Equation 6]}$$
$$\frac{3}{2}\{R_r(i_{dr}^{\omega 2} + i_{qr}^{\omega 2}) + (\omega - \omega_r)(\lambda_{dr}^\omega i_{qr}^\omega - \lambda_{qr}^\omega i_{dr}^\omega)\}$$

The rotor current command i* for synthesizing the torque command Te* of the outer controller and the rotor power command Pr* may be represented by the equation 7 and the equation 8 through the equation 5 and the equation 6. The rotor current command i* satisfying the conditions of the equation 7 and the equation 8 may be represented by the equation 9, and such a rotor current command i* plays a role of the current command generator.

$$T_e^* = \frac{3}{2}\frac{P}{2}(\lambda_{qr}^\omega i_{dr}^{\omega *} - \lambda_{dr}^\omega i_{qr}^{\omega *}) \quad \text{[Equation 7]}$$

$$P_r^* = \frac{3}{2}(v_{dr}^\omega i_{dr}^{\omega *} + v_{qr}^\omega i_{qr}^{\omega *}) = \frac{3}{2}R_r(i_{dr}^{\omega *2} + i_{qr}^{\omega *2}) + \frac{2}{P}(\omega - \omega_r)T_e^* \quad \text{[Equation 8]}$$

$$(i_{dr}^{\omega *}, i_{qr}^{\omega *}) = f(T_e^*, P_r^*) \quad \text{[Equation 9]}$$

The voltage relational equation and the torque equation of the induction motor may be represented by an arbitrary coordinate system. When they are represented by a rotor magnetic flux coordinate system, the rotor magnetic flux of the equation 2 is represented by the equation 10.

$$\lambda_{dr}^f = L_m i_{ds}^f + L_r i_{dr}^f$$

$$\lambda_{qr}^f = L_m i_{qs}^f + L_r i_{qr}^f \quad \text{[Equation 10]}$$

In the rotor magnetic flux coordinate system, the equation 7 to the equation 9 may be simply represented by the equation 11 to the equation 13 by the condition of the equation 10.

$$T_e^* = -\frac{3}{2}\frac{P}{2}\lambda_{dr}^f i_{qr}^{f*} \quad \text{[Equation 11]}$$

$$P_r^* = \quad \text{[Equation 12]}$$
$$\frac{3}{2}(v_{dr}^f i_{dr}^{f*} + v_{qr}^f i_{qr}^{f*}) = \frac{3}{2}R_r(i_{dr}^{f*2} + i_{qr}^{f*2}) - \frac{3}{2}(\omega - \omega_r)\lambda_{dr}^f i_{qr}^{f*}$$

$$(i_{dr}^{f*}, i_{qr}^{f*}) = f_f(T_e^*, P_r^*) \quad \text{[Equation 13]}$$

The rotor current command i* may be generated using the equation 7 to the equation 9. When the rotor coordinate system is used, they are represented by the equation 11 to the equation 13. The current command generator 430 may perform moment torque control driving of the induction motor by the torque condition necessary to drive the motor and the rotor power control for driving the rotor power conversion device.

The rotor DC-link voltage controller 420 for controlling the rotor DC-link voltage Vdc calculates the rotor power command Pr*, the current command generator 430 calculate the current command i* for generating the torque of the torque command while controlling the rotor DC-link voltage Vdc. The rotor DC-link voltage controller 420 and the current command generator 430 used herein may be embodied by several cases. A function for calculating the current command may be induced through the equation 11 to the equation 13.

Figure 13:
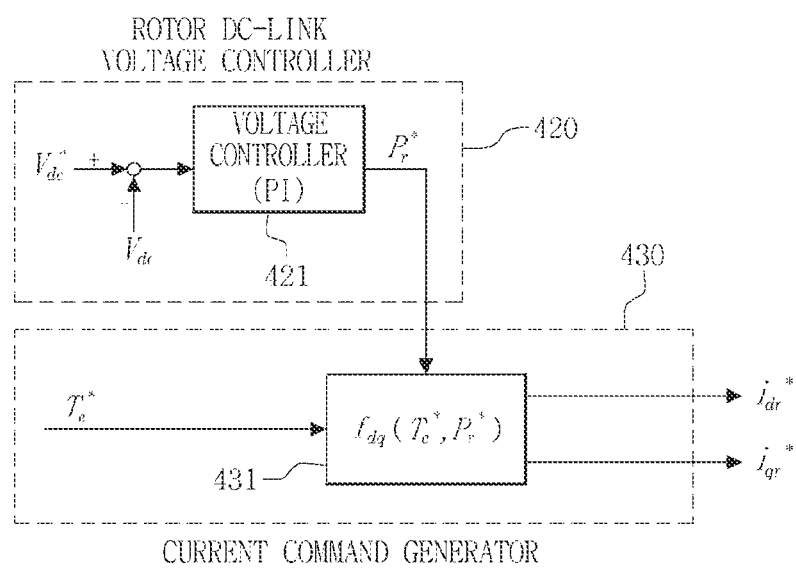
FIG. 13 is a diagram illustrating internal structures of a rotor DC-link voltage controller 420 and a current command generator 430 according to an embodiment of the present disclosure.

FIG. 13 is a diagram illustrating internal structures of a rotor DC-link voltage controller 420 and a current command generator 430 according to an embodiment of the present disclosure. The rotor DC-link voltage controller 420 has a type of feedback controller, measures an output value of a target to be controlled, compares the output value with a reference value or a set point to calculate an error, and calculates a control value necessary for the control using the error value. The rotor DC-link voltage controller 420 may include all of a P controller, PI controller, and a PID controller, and in this embodiment, the PI controller 421 is used. The current command generator 430 may generate the d-axis current command id* and the q-axis current command iq* using the equation 11 to the equation 13 on the basis of the torque command Te* and the rotor power command Pr* of the voltage controller through the first current command generating module 431.

Figure 14:
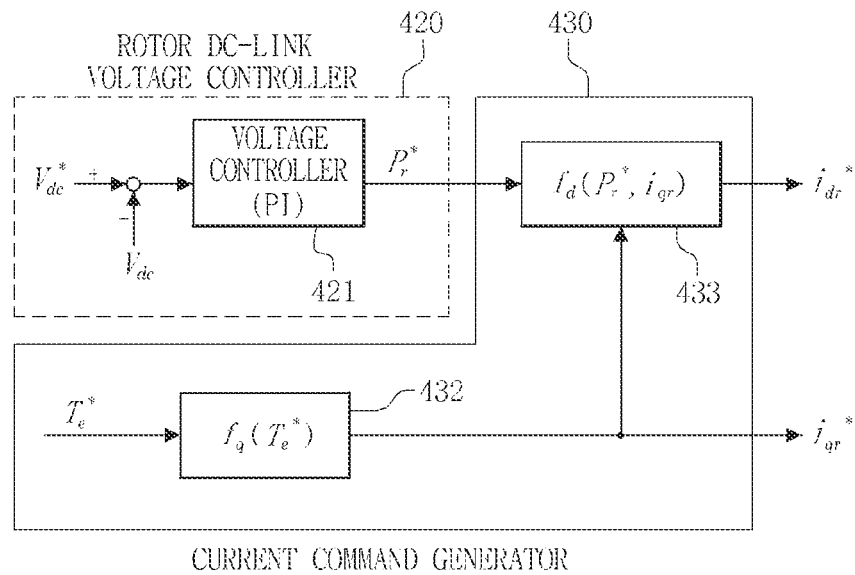
FIG. 14 is a diagram illustrating internal structures of a rotor DC-link voltage controller 420 and a current command generator 430 according to another embodiment of the present disclosure.

FIG. 14 is a diagram illustrating internal structures of a rotor DC-link voltage controller 420 and a current command generator 430 according to another embodiment of the present disclosure. The rotor DC-link voltage controller 420 may include all of a P controller, PI controller, and a PID controller, and in this embodiment, the PI controller 421 is used. The current command generator 430 may generate the q-axis current command iq* on the basis of the torque command Te* through the second current command generating module 432, and may generate the d-axis current command id* on the basis of the rotor power command Pr* of the voltage controller and the q-axis current command iq* through the third current command generating module 433. Also in this process, the equation 11 to the equation 13 may be used.

Figure 15:
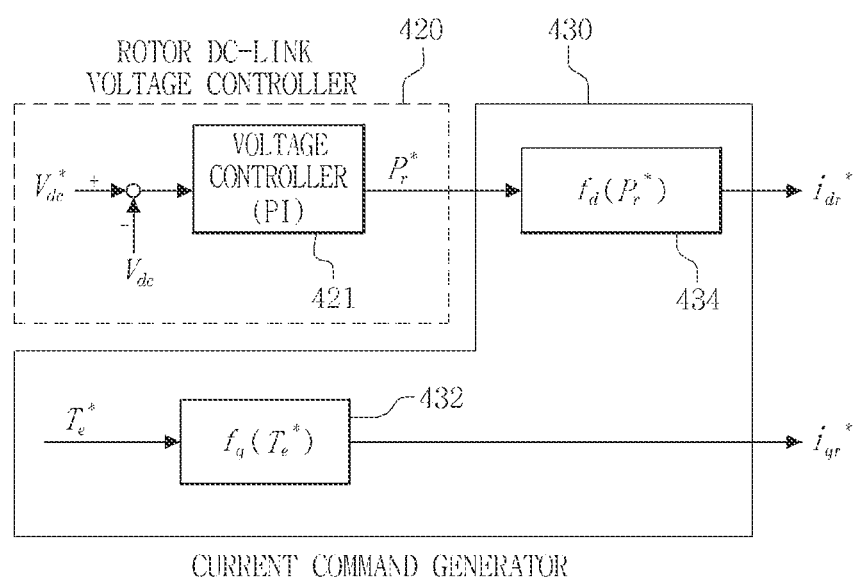
FIG. 15 is a diagram illustrating internal structures of a rotor DC-link voltage controller 420 and a current command generator 430 according to still another embodiment of the present disclosure.

FIG. 15 is a diagram illustrating internal structures of a rotor DC-link voltage controller 420 and a current command generator 430 according to still another embodiment of the present disclosure. The rotor DC-link voltage controller 420 may include all of a P controller, PI controller, and a PID controller, and in this embodiment, the PI controller 421 is used. The current command generator 430 may generate the q-axis current command iq* on the basis of the torque command Te* through the third current command generating module 432, and may generate the d-axis current command id* on the basis of the rotor power command Pr* of the voltage controller through the fourth current command generating module 434. Also in this process, the equation 11 to the equation 13 may be used, the rotor power command Pr* is 0 at the time of generating the q-axis current command iq*, and the torque command Te* is 0 at the time of generating the d-axis current command id*.

According to the present disclosure, it is possible to reduce the necessary amount of the power conversion device by a half or more, as compared with the induction motor structure of the related art.

In addition, it is possible to smoothly control the variable speed although the induction motor is directly connected to the systematic power supply.

Furthermore, it is possible to lower the harmonic ratio of various systematic power supplies including 3 phases.

The present disclosure has been described above by specific items such as specific constituent elements, the embodiments, and the drawings. However, they are provided merely to help more overall understanding of the present disclosure, but the present disclosure is not limited to the embodiments, and a person skilled in the art may variously amend and modify the description.

Accordingly, the sprit of the present disclosure should not be determined to be limited to the embodiments described above, claims to be described later and all the equivalent modifications of claims belong to the scope of the sprint of the present disclosure.

What is claimed is:

1. An induction motor comprising:
a stator in which coils directly connected to a single-phase or 3-phase or more systematic power supply are wound;
a rotor that is supported to be rotatable in the stator;
a power conversion device that is formed on a surface of the rotor and controls a rotor current without connection of a separate external power supply; and
a control circuit that is connected to the power conversion device and controls the power conversion device,
wherein the power conversion device is unwired to the systematic power supply,
wherein the control circuit comprises a current controller that generates a voltage command on the basis of a rotor current command, a DC-link voltage of the power conversion device, and a rotor current, and
wherein the power conversion device applies a voltage to the rotor on the basis of the generated voltage command.

2. The induction motor according to claim 1, wherein the power conversion device is an inverter using a power element.

3. The induction motor according to claim 1, wherein the power conversion device is connected to a load and an insulated voltage is transmitted to the load.

4. The induction motor according to claim 1, wherein the control circuit further comprises:
an outer controller that generates a torque command necessary to drive the induction motor;
a rotor DC-link voltage controller that generates a power command of the rotor on the basis of the DC-link voltage;
a current command generator that generates the rotor current command on the basis of the generated torque command and/or the generated rotor power command.

5. The induction motor according to claim 4, wherein the rotor current command includes a d-axis current command and a q-axis current command, and
wherein the current command generator generates the q-axis current command on the basis of the torque command, and generates the d-axis current command on the basis of the power command of the rotor and the q-axis current command, to generate the rotor current command.

6. The induction motor according to claim 4, wherein the rotor current command includes a d-axis current command and a q-axis current command, and
wherein the current command generator generates the q-axis current command on the basis of the torque command, and generates the d-axis current command on the basis of the power command of the rotor, to generate the rotor current command.

7. The induction motor according to claim 4, wherein the rotor current command includes a d-axis current command and a q-axis current command, and
wherein the current command generator generates the d-axis current command and the q-axis current command on the basis of the torque command and the power command of the rotor, to generate the rotor current command.

8. The induction motor according to claim 4, wherein the outer controller includes a speed feedback controller that controls a speed of the rotor.

9. An induction motor comprising:
a stator in which coils directly connected to a single-phase or 3-phase or more systematic power supply are wound;
a rotor that is supported to be rotatable in the stator;
a contactor that is attached to a rotor shaft to allow an electric current to flow in the rotor from the outside;
a power conversion device that is connected to the rotor through the contactor out of the rotor and controls a rotor current without connection of a separate external power supply; and
a control circuit that is connected to the power conversion device and controls the power conversion device,
wherein the power conversion device is unwired to the systematic power supply,
wherein the control circuit comprises a current controller that generates a voltage command on the basis of a rotor current command, a DC-link voltage of the power conversion device, and a rotor current,
wherein the power conversion device applies a voltage to the rotor on the basis of the generated voltage command.

10. The induction motor according to claim 9, wherein the power conversion device is an inverter using a power element.

11. The induction motor according to claim 9, wherein the power conversion device is connected to a load and an insulated voltage is transmitted to the load.

12. The induction motor according to claim 9, wherein the control circuit further comprises:
an outer controller that generates a torque command necessary to drive the induction motor;
a rotor DC-link voltage controller that generates a power command of the rotor on the basis of the DC-link voltage.

13. The induction motor according to claim 12, wherein the rotor current command includes a d-axis current command and a q-axis current command, and
wherein the current command generator generates the q-axis current command on the basis of the torque command, and generates the d-axis current command on the basis of the power command of the rotor and the q-axis current command, to generate the rotor current command.

14. The induction motor according to claim 12, wherein the rotor current command includes a d-axis current command and a q-axis current command, and
wherein the current command generator generates the q-axis current command on the basis of the torque command, and generates the d-axis current command on the basis of the power command of the rotor, to generate the rotor current command.

15. The induction motor according to claim 12, wherein the rotor current command includes a d-axis current command and a q-axis current command, and
wherein the current command generator generates the d-axis current command and the q-axis current command on the basis of the torque command and the power command of the rotor, to generate the rotor current command.

16. A control method of an induction motor, the method comprising:
generating a torque command necessary to drive the induction motor including a stator in which coils directly connected to a single-phase or 3-phase or more systematic power supply are wound, a rotor that is supported to be rotatable in the stator, a power conversion device that is attached to the rotor and controls a rotor current without connection of a separate external power supply, and a control circuit that is connected to the power conversion device and controls the power conversion device;

generating a power command of the rotor on the basis of a DC-link voltage of the power conversion device;

generating a rotor current command on the basis of the generated torque command and/or the generated rotor power command;

generating a voltage command on the basis of the generated rotor current command, the DC-link voltage, and the rotor current; and applying, by the power conversion device, voltage to the rotor on the basis of the generated voltage command to control the rotor current.

17. The control method of the induction motor according to claim 16, wherein the rotor current command includes a d-axis current command and a q-axis current command, and wherein in the generating of the rotor current command, the q-axis current command is generated on the basis of the torque command, and the d-axis current command is generated on the basis of the power command of the rotor and the q-axis current command, to generate the rotor current command.

18. The control method of the induction motor according to claim 16, wherein the rotor current command includes a d-axis current command and a q-axis current command, and wherein in the generating of the rotor current command, the q-axis current command is generated on the basis of the torque command, and the d-axis current command is generated on the basis of the power command of the rotor, to generate the rotor current command.

19. The control method of the induction motor according to claim 16, wherein the rotor current command includes a d-axis current command and a q-axis current command, and wherein in the generating of the rotor current command, the d-axis current command and the q-axis current command are generated on the basis of the torque command and the power command of the rotor, to generate the rotor current command.

* * * * *